US007007714B2

(12) United States Patent
Carroll

(10) Patent No.: US 7,007,714 B2
(45) Date of Patent: Mar. 7, 2006

(54) HIGH PRESSURE TRAVERSE FLOW ADJUSTABLE GAS REGULATOR

(75) Inventor: Kent L. Carroll, Bolingbrook, IL (US)

(73) Assignee: Hose Shop, Ltd., Crystal Lake, IL (US)

( * ) Notice: Subject to any disclaimer, the term of this patent is extended or adjusted under 35 U.S.C. 154(b) by 153 days.

(21) Appl. No.: 10/729,791

(22) Filed: Dec. 5, 2003

(65) Prior Publication Data

US 2005/0121083 A1 Jun. 9, 2005

(51) Int. Cl.
*G05D 16/10* (2006.01)

(52) U.S. Cl. ................................. 137/505.25; 137/613

(58) Field of Classification Search ........... 137/505.25, 137/505.28, 613

See application file for complete search history.

(56) References Cited

U.S. PATENT DOCUMENTS

| | | | | |
|---|---|---|---|---|
| 509,923 A * | 12/1893 | Locke | 137/505.25 |
| 1,183,920 A * | 5/1916 | Wallace | 137/505.25 |
| 3,538,930 A * | 11/1970 | Slawomir | 137/505.25 |
| 5,507,308 A * | 4/1996 | Chambonnet | 137/505.25 |
| 5,669,369 A * | 9/1997 | Scott | 137/505.25 |
| 5,996,625 A * | 12/1999 | Collado et al. | 137/614.19 |

* cited by examiner

*Primary Examiner*—Stephen M. Hepperle
(74) *Attorney, Agent, or Firm*—Welsh & Katz, Ltd.

(57) ABSTRACT

A transverse flow adjustable pressure regulator controls the flow of a gas from a high pressure source to a low pressure device. The regulator includes a body having an inlet port and a pressure chamber. A bonnet engages the body to define a piston chamber and a transverse outlet port. An end cap is positioned at an end of the bonnet. A regulating assembly is disposed in the pressure chamber that includes a seat and a seat support, a thrust element, a retaining element and a seal disposed in part between the thrust element and the retaining element. A piston assembly has a power tube terminating at a regulating end. The piston has a piston portion having a pressure face and a piston stem. The regulating end defines a passage contiguous with a cross-bore in the piston stem. The piston moves in the piston chamber with the power tube traversing through the retaining element and with the seal, between a closed state in which the regulating end is seated on the sealing element and an open state in which the regulating end is unseated. A biasing element is operably connected to the piston assembly, exerting a force on the piston to urge the piston to the open state. Gas pressure exerts a force on the piston pressure face to urge the piston closed. The force exerted by the biasing element on the piston is adjustable to vary the force of the gas pressure required to move the piston assembly from open to closed.

17 Claims, 1 Drawing Sheet

HIGH PRESSURE TRAVERSE FLOW ADJUSTABLE GAS REGULATOR

BACKGROUND OF THE INVENTION

The present invention is directed to a novel pressure regulator. More particularly, the present invention relates to an adjustable linear pressure regulator for use in paint ball guns that use compressed gas to fire projectiles. The present invention is also adapted for use with other pressurized gas devices.

Sporting events that provide the participant with an adventure in military strategy and the feel of the fear and exhilaration of battle have become very popular. One such sporting event is commonly referred to as "paintball". In this event, participants fire paint-filled projectile balls at one another. Generally participants are equipped with a gas projectile gun or rifle (which can launch a projectile without seriously harming the victim) and protective gear and are divided into two or more combat groups each with the goal of surviving the others. Participants fire projectiles, or paintballs, at one another and, when struck, are "painted" by the paint ball. The objective of such an event is to be the last person that has not been "painted" or hit with a projectile.

Typically, the projectiles used in these events are propelled, generally using a compressed gas to avoid the potential dangers of explosives such as gun powder. The dangers of explosives include not only the physical danger of the explosion but also the increased speed that such explosions impart to projectiles, potentially making innocuous projectiles, such as paintballs, deadly. Moreover, compressed gas is less costly than explosives and is readily obtainable.

When these types of systems are used, compressed gas is provided or supplied from a high-pressure source carried by the participant in a gas bottle. Although high-pressure gas is needed at the gun firing mechanism to propel the paint balls, typically the pressure in these bottles is greater than the pressure needed to safely propel the projectile within the parameters of the game. As such, it is necessary to regulate the pressure of the compressed gas provided to the gun firing mechanism to allow projectiles to be launched at a safer velocity and prevent damage to the gun. Typically, a regulator is provided, mounted to the gun or the compressed gas bottle. That is, it is carried by the game participant.

Known pressure regulator can be quite large and as such can add considerable weight to the gun. In that one of the objectives of paint ball is to avoid one's opponent, any added weight is undesirable.

Moreover, although many such regulators in fact function well to regulate and reduce pressure from the bottle to the firing mechanism, often such pressure regulation or reduction is rough. That is, the outlet pressure is typically within a range that is specified for the particular gun. However, there remains an "optimum" pressure for the mechanism to operate.

Accordingly, there exists a need for a pressure regulator that can be easily adjusted to provide a downstream or outlet pressure. Desirably, such a regulator is sufficiently small and light-weight so that it does not increase, to any extent, the weight carried by a participant in a paint ball sporting event. More desirably such a regulator provides a precisely controlled, adjustable downstream pressure that can be set for optimum gun performance.

BRIEF SUMMARY OF THE INVENTION

An adjustable, linear gas pressure regulator provides both gross and fine pressure regulation to provide a precisely controlled downstream pressure, essentially regardless of changes in the upstream pressure. The regulator is used to control the flow of a gas from a high pressure source to a low pressure device. The gas is delivered from the regulator at a predetermined outlet pressure.

The regulator is of a transverse design. The regulator includes a body defining an inlet port and a pressure chamber in flow communication with the inlet port. A bonnet is engageable with the body to define a piston chamber and at least one transverse outlet port contiguous with the piston chamber. Preferably, a juncture of the outlet port and the piston chamber defines a plenum region and a pair of opposingly disposed outlet ports contiguous are with the piston chamber, at the plenum region.

An end cap is disposed at an end of the bonnet opposite the body. Bearings are disposed between the cap and the bonnet.

A regulating assembly is disposed in the pressure chamber. The regulating assembly includes a seat and a seat support to support the seat in a stationary manner in the pressure chamber. The regulating assembly further includes a thrust element, a retaining element and a seal disposed in part between the thrust element and the retaining element. In a present regulator, the seal is a bifurcated seal with an open end that is oriented toward the thrust element.

A piston assembly is disposed in the piston chamber. The piston assembly has a power tube terminating at an open tubular regulating end, a piston portion having a pressure face and a piston stem. The open tubular regulating end defines a passage that is contiguous with a cross-bore formed in the piston stem.

The piston is movable in the piston chamber with the power tube traversing through the retaining element, with the seal engaged with the power tube to form a gas tight seal between the power tube and the retaining element. The piston assembly reciprocates between a closed state in which the regulating end is engaged with (i.e., seated on) the sealing element and an open state in which the regulating end is out of engagement with (i.e., unseated from) the sealing element.

A biasing element operably is connected to the piston assembly to urge the piston assembly to the open state. Gas pressure exerting a force on the piston pressure face urges the piston assembly to the closed state. The force exerted by the biasing element on the piston assembly is adjustable to vary the force of the gas pressure required to move the piston assembly from the open state to the closed state.

In a present regulator, the biasing element force is adjustable by rotation of the piston relative to the end cap. In such an arrangement, the end cap remains rotationally stationary and reciprocates with opening and closing of the regulator A preferred biasing element is formed from a plurality of elements. Preferably, the elements are spring washers.

The regulator can include an isolation valve disposed in the body. Such an isolation valve is disposed between the inlet port and the pressure chamber.

These and other features and advantages of the present invention will be apparent from the following detailed description, in conjunction with the appended Claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
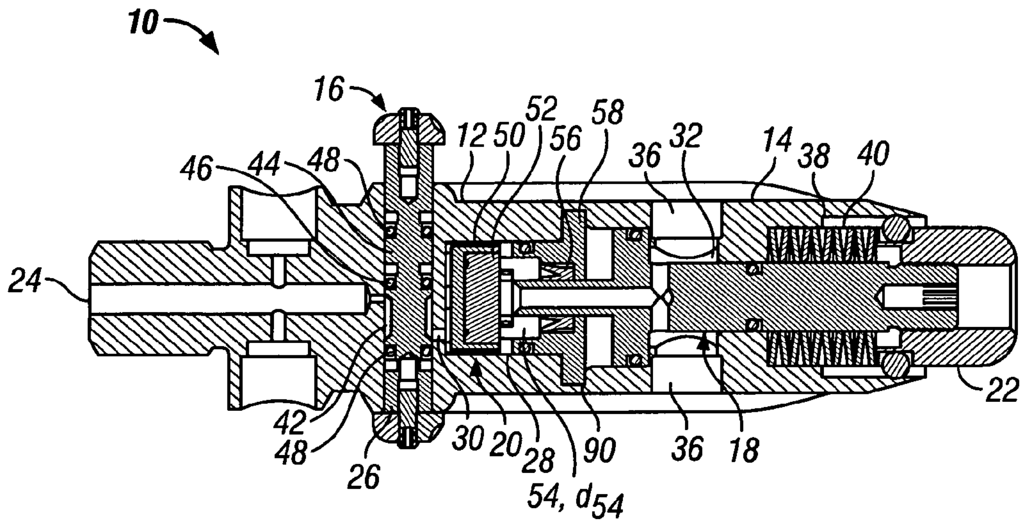
FIG. 1 is a cross-sectional view of a high pressure transverse flow adjustable gas pressure regulator embodying the principles of the present invention, the regulator being shown in the open state to allow passage of gas.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the U.S. Patent Office, and does not imply, nor should be inferred to limit the subject matter disclosed herein.

Figure 2:
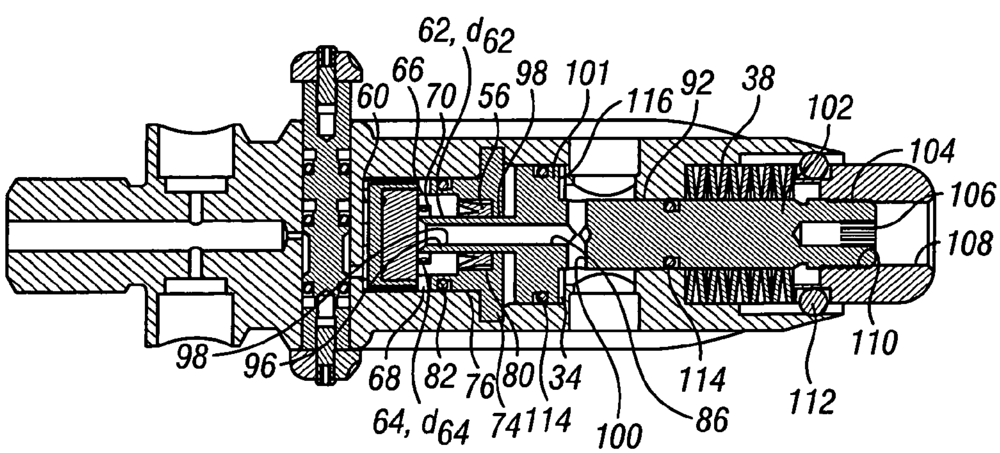
FIG. 2 is a cross-sectional view of the gas regulator in the closed state to isolate or stop the passage of gas.

Referring now to the figures, and in particular to FIG. 1, a present regulator 10 is configured to function as a both a gross, as well as a fine pressure reduction and regulating device. The present regulator 10 is a pressure to close configuration. That is, pressure is required to close the regulator 10 or isolate flow through the regulator 10. The regulator 10 provides a precisely controlled downstream pressure that is regulated or reduced where necessary, essentially regardless of changes in upstream pressure. As seen in FIG. 1, the regulator 10 is in the open state and as seen in FIG. 2, the regulator 10 is in the closed state.

The regulator 10 includes generally, a main body 12, a bonnet 14, an on-off valve 16, a piston assembly 18, a regulating assembly 20 and an end or adjusting cap 22. The body 12 includes an inlet port 24 that is in flow communication with a valve chamber 26. A pressure chamber 28 is in flow communication with the valve chamber 26 via a short valve chamber outlet port 30.

The bonnet 14 joins to the body 12 at about the pressure chamber 28. A piston chamber 32 is formed in the bonnet 14 contiguous with the pressure chamber 28. A plenum region 34 extends from the piston chamber 32 to a pair of outlet ports 36 in the bonnet 14. The outlet ports 36 are also transverse (and preferably perpendicular) to the piston chamber 32 and longitudinal axis $A_{10}$ of the regulator 10. A spring chamber 38 in the bonnet 14 is contiguous with the piston chamber 32 and is configured to receive the piston assembly 18 with a spring 40 disposed about the assembly 18. The end cap or adjusting cap 22 is disposed on an end of the piston assembly 18, extending outwardly from an end of the bonnet 14.

The on-off valve 16 is a reciprocating element having a flow channel 42 and a stop plug 44 separated from one another by a seal 46. Seals 48 are also disposed on the outboard sides of the flow channel 42 and stop plug 44 to better seal the valve 16 and facilitate sliding the valve 16 between the on and off states. The valve 16 is configured such that when the flow channel 42 is positioned in the valve chamber 26 to provide communication between the regulator inlet port 24 and the valve chamber outlet port 30, flow through the regulator 10 is established. Conversely, when the plug 44 is positioned between the regulator inlet port 24 and the valve chamber outlet port 30, flow through the regulator 10 is stopped or isolated.

The regulating assembly 20 is disposed in the pressure chamber 28. The regulating assembly 20 includes a seal cup 50, a sealing disk 52, a thrust element 54, a seal 56 and a seal retainer 58. The seal cup 50 is a cup shaped element disposed in the pressure chamber 28 with the "bottom" of the cup 50 overlying the valve chamber outlet port 30 (i.e., overlying the inlet to the pressure chamber 28). The cup 50 has a plurality of passages 60 formed in the bottom and up along the sides of the cup 50 that allow passage of gas from the outlet port 30 along the cup 50 bottom and up along the cup 50 sides.

The sealing disk 52 is disposed in the cup 50. A present disk 52 is formed from a resilient material such as urethane. The disk 52 forms the regulator seat for establishing and isolating flow through the regulator 10.

The thrust element 54 is disposed on the sealing disk 52. The thrust element 54 is a sleeve-like member that is formed as a cylinder having a central bore 62 of a first diameter $d_{62}$ and a second, partial bore 64 having a larger diameter $d_{64}$, that defines a collar 66. The overall diameter $d_{54}$ of the element 54 is, however, smaller than that of the disk 52 and cup 50. As such, an annular flow area 68 is established over the edge of the cup 50 and the sealing disk 52, between the wall of the pressure chamber 32 and the thrust element 54. A plurality of radially oriented openings 70 are formed in the collar 66 that extend through the thrust element 54 wall. The openings 70 provide flow communication from the outer annular flow area 68 into the inner central bore 64 (in the collar area 66). As will be discussed below, the central bore 64 is configured to receive a portion of the piston assembly 18.

The seal retainer 58 is fitted over the thrust element 54. The seal retainer 58 secures the thrust element 54 in place and as such retains the sealing disk 52 and seal cup 50 in place as well. The seal retainer 58 includes an outer flange 74 and a central sleeve-like portion 76. The central sleeve-like portion 76 includes a bore 78 (through which a portion of the piston 18 extends). An end of the retainer 58 defines a wall of the annular flow area 68. An inner region 80 of the retainer 58 is formed having a stepped profile defining a seal well 82. The stepped profile is configured such that the seal 56 is fitted into the well 82 to form a seal around the power tube portion 86 of the piston assembly 18. A present regulator 10 includes a bifurcated seal 84, having a V-shaped cross-section, with the V oriented such that gas flow is into the V (that is, the open end 88 of the V is in the upstream position).

The seal retainer outer flange 74 lies flush with an end wall 90 of the main body 12. The bonnet 14 is fitted over the flange 74, abutting the body 12, essentially sandwiching the flange 74 between the body 12 and bonnet 14.

The piston chamber 32 is formed in the bonnet 14 and includes a stepped profile. The chamber 32 is configured to receive the piston assembly 18 for reciprocating movement therein. A step defines the transverse chamber 34, formed on opposing sides of the bonnet 14, which in turn define a piston stem bore 92 on the longitudinally opposing side of the transverse chamber 34. The piston stem bore 92 opens into the larger bore spring chamber 38.

The piston assembly 18 is disposed in the piston chamber 32. The piston assembly 18 has a cruciform cross-sectional profile. A regulating end portion 96 of the cruciform has a central bore 98 that defines the power tube 86 and that continues to a transverse bore 100 across the cruciform immediately beyond the piston element 101 which, in cross-section, appears to form the cruciform "arms". The base of the cruciform (i.e., the piston stem 62) extends into the piston chamber 32 and into the spring chamber 38.

The spring 40 is disposed about the piston stem 102 in the spring chamber 38. In a present regulator 10, the spring 40 is formed from a plurality or stack of Belleville spring washers that are compressed between the spring chamber 38 wall and the adjusting cap 22. As constructed, the spring 40 tends to "pull" the piston assembly 18 to the open position. This is in contrast to known designs in which the spring is positioned on the opposite of the piston which functions to "push" the piston open. The present regulator 10 configuration allows for preloading adjustment on the spring to be externally accessible. Those skilled in the art will recognize that other spring or biasing elements, such as coil springs and the like, can be used to bias the piston assembly 18. The piston stem 102 includes an externally threaded end 104 and a internally engageable formation 106 (presently a hex form) so that the piston assembly 18 can be rotated relative to (i.e., threaded within) the end cap 22. To this end, the end cap 22 includes a central bore 108 with an open end and an internal thread 110 for threadedly engaging the piston stem 102.

The end cap 22 is disposed in an end of the bonnet 14 at about the end of the spring chamber 38. Bearings 112 are positioned between the cap 22 and the chamber 38 wall to permit ready (longitudinal) movement of the cap 22 within the chamber 38. The bearings 112 reduce friction as the cap 22 moves longitudinally within the chamber 38. Rotation of the piston assembly 18 (with the cap 22 held stationary) increases or decreases compression of the spring 40, the effect of which is described in detail below.

Seals 48 are disposed about the on-off valve 16 between the flow channel 42 and the stop plug 44 and on either side of the channel 42 and plug 44. Seals 114 are also positioned on the sleeve portion 76 of the seal retainer 58, on the piston element 101 and on the piston stem 102. These seals can be, for example, O-rings formed from neoprene or the like.

FIG. 1 illustrates the regulator 10 in the open state. In this state, (with the on-off valve 16 open), high pressure gas enters the regulator 10 through the inlet port 24. The gas flows through the on-off valve 16 and into the valve chamber outlet port 30. The gas (still at high pressure) enters the pressure chamber 28 at the bottom of the seal cup 50 and flows through the cup gas passages 60 into the annular flow area 68.

Gas (still at high pressure) flows from the annular flow area 68 into the collar area 66 through the thrust element radial openings 70. With the piston power tube 86 unseated from the sealing disk 52, gas flows into the power tube 86, through the transverse bore 100, and into the piston chamber 28 at the transverse chamber 34. The gas (now regulated) flows out of the regulator 10 through the outlet ports 36.

The gas at downstream pressure applies a force to the pressure face 116 of the piston 101. The pressure is applied against the spring 40 force (which urges the regulator 10 to the open state). The spring 40, acting against the end cap 22 (which is threaded onto the end of the piston stem 102), pulls the piston power tube 86 from the sealing disk 52, thus permitting flow. When the downstream, regulated pressure is sufficient to overcome the spring 40 force, the gas within the plenum region 34 exerts a force on the piston pressure face 116, acting against the spring 40 force, and urges the piston assembly 18 to the closed position, thus regulating the outlet pressure.

As will be appreciated from the figures, as the outlet pressure increases and decreases (thus closing and opening, respectively, the regulator 10), the piston assembly 18 reciprocates within the piston chamber 32. In that the piston stem 102 is threadedly engaged with the end cap 22, the end cap 22, likewise reciprocates, which reciprocation is facilitated by the bearings 112 present between the end cap 22 and the spring chamber 38 wall.

The present regulator 10 is adjustable to provide a regulated, predetermined or pre-set outlet pressure. The outlet pressure can be set, essentially regardless of the upstream or inlet pressure, by varying the preload on the spring 40 (which is best carried out when the piston assembly 18 is in the fully opened state). That is, by varying the spring 40 preload (i.e., compression) the outlet pressure of the regulator 10 can be set, regardless of the inlet pressure.

To vary or change the spring 40 preload, (with the piston fully opened, that is with the regulator at atmospheric pressure) the piston assembly 18 is rotated by engaging the interior form 106 (e.g., by insertion of a hex or Allen wrench into the piston stem 102 and) and rotating the piston assembly 18 while maintaining the end cap 22 fixed. With the piston assembly 18 at the full open position (not reciprocating), rotating the assembly 18 serves to compress or relax the spring 40 to increase or decrease the preload.

As will be appreciated from the figures and the above description, the present regulator 10 provides a compact, reliable pressure regulating/reducing device with on/off capability. The present regulator 10 is relatively easy to set and use. It has been found that the present regulator 10 is capable of regulating inlet pressures as high as 4500 pounds per square inch (psi). The present regulator 10 carries out this function with minimal moving parts and a stationary sealing mechanism. In addition, the integral on-off valve 16 provides a compact, diverse unit.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A transverse flow adjustable pressure regulator for controlling the flow of a gas from a high pressure source to a low pressure device, the gas being delivered from the regulator at a predetermined outlet pressure, comprising:

- a body defining an inlet port and a pressure chamber in flow communication with the inlet port;
- a bonnet engageable with the body to define a piston chamber and at least one transverse outlet port contiguous with the piston chamber;
- an end cap disposed at an end of the bonnet opposite the body;
- a regulating assembly disposed in the pressure chamber, the regulating assembly including a seat and a support for the seat to support the seat in a stationary manner in the pressure chamber, the regulating assembly further including a thrust element, a retaining element and a seal disposed in part between the thrust element and the retaining element, the seal having an inner periphery;

a piston assembly having a power tube terminating at an open tubular regulating end, a piston portion having a pressure face and a piston stem, the open tubular regulating end defining a passage contiguous with a cross-bore formed in the piston stem, wherein the piston is movable in the piston chamber with the power tube traversing through the retaining element, with the seal being in engagement with the power tube to form a gas tight seal between the power tube and the retaining element, the piston assembly reciprocating between a closed state in which the open tubular regulating end is in engagement with the sealing element to isolate flow through the regulator and an open state in which the open tubular regulating end is out of engagement with the sealing element to establish flow though the regulator; and a biasing element operably connected to the piston assembly, the biasing element exerting a force on the piston assembly to urge the piston assembly to the open state, and wherein gas pressure exerting a force on the piston pressure face urges the piston assembly to the closed state, and wherein the force exerted by biasing element on the piston assembly is adjustable to vary the force of the gas pressure required to move the piston assembly from the open state to the closed state.

2. The pressure regulator in accordance with claim 1 wherein the seal is a bifurcated seal.

3. The pressure regulator in accordance with claim 2 wherein the bifurcated seal defines an open end and wherein the open end is oriented toward the thrust element.

4. The pressure regulator in accordance with claim 1 wherein the biasing element force is adjustable by rotation of the piston relative to the end cap.

5. The pressure regulator in accordance with claim 4 wherein the end cap remains rotational stationary and reciprocates with opening and closing of the regulator.

6. The pressure regulator in accordance with claim 4 including a bearing disposed between the end cap and the bonnet.

7. The pressure regulator in accordance with claim 1 including an isolation valve disposed in the body.

8. The pressure regulator in accordance with claim 7 wherein the isolation valve is disposed between the inlet port and the pressure chamber.

9. The pressure regulator in accordance with claim 1 wherein a juncture of the outlet port and the piston chamber defines a plenum region.

10. The pressure regulator in accordance with claim 1 including a pair of opposingly disposed outlet ports contiguous with the piston chamber.

11. The pressure regulator in accordance with claim 1 wherein the biasing element is formed from a plurality of elements.

12. The pressure regulator in accordance with claim 11 wherein each of the elements is a spring washer.

13. A transverse flow adjustable pressure regulator for controlling the flow of a gas from a high pressure source to a low pressure device, the gas being delivered from the regulator at a predetermined outlet pressure, comprising:

a body defining an inlet port and a pressure chamber in flow communication with the inlet port;

a bonnet engageable with the body to define a piston chamber and a pair of opposingly disposed outlet ports contiguous with the piston chamber, a juncture of the outlet ports and the piston chamber defining a plenum region;

an end cap disposed at an end of the bonnet opposite the body;

a regulating assembly disposed in the pressure chamber, the regulating assembly including a seat and a support for the seat to support the seat in a stationary manner in the pressure chamber, the regulating assembly further including a thrust element, a retaining element and a seal disposed in part between the thrust element and the retaining element, the seal being a bifurcated seal defining an open end oriented toward the thrust element, the sealing having an inner periphery;

a piston assembly having a power tube terminating at an open tubular regulating end, a piston portion having a pressure face and a piston stem, the open tubular regulating end defining a passage contiguous with a cross-bore formed in the piston stem, wherein the piston is movable in the piston chamber with the power tube traversing through the retaining element, with the seal being in engagement with the power tube to form a gas tight seal between the power tube and the retaining element, the piston assembly reciprocating between a closed state in which the open tubular regulating end is in engagement with the sealing element to isolate flow through the regulator and an open state in which the open tubular regulating end is out of engagement with the sealing element to establish flow though the regulator; and a biasing element operably connected to the piston assembly, the biasing element exerting a force on the piston assembly to urge the piston assembly to the open state, and wherein gas pressure exerting a force on the piston pressure face urges the piston assembly to the closed state, and wherein the force exerted by biasing element on the piston assembly is adjustable to vary the force of the gas pressure required to move the piston assembly from the open state to the closed state, the biasing element force being adjustable by rotation of the piston relative to the end cap, and wherein during adjustment, the end cap remains rotationally stationary, and wherein the end cap reciprocates with opening and closing of the regulator.

14. The pressure regulator in accordance with claim 13 including an isolation valve disposed in the body.

15. The pressure regulator in accordance with claim 14 wherein the isolation valve is disposed between the inlet port and the pressure chamber.

16. The pressure regulator in accordance with claim 13 wherein the biasing element is formed from a plurality of elements.

17. The pressure regulator in accordance with claim 16 wherein each of the elements is a spring washer.

* * * * *